Oct. 29, 1940.  R. I. MARKEY  2,219,655
MEANS FOR SUPPORTING TAIL PIPES
Filed Sept. 30, 1939
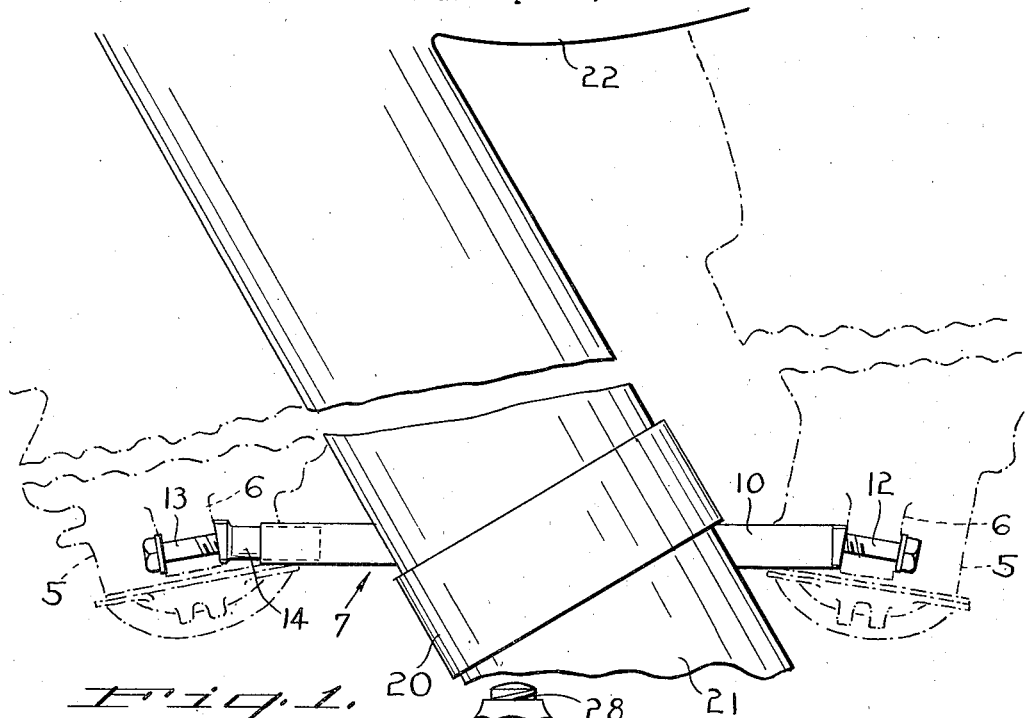
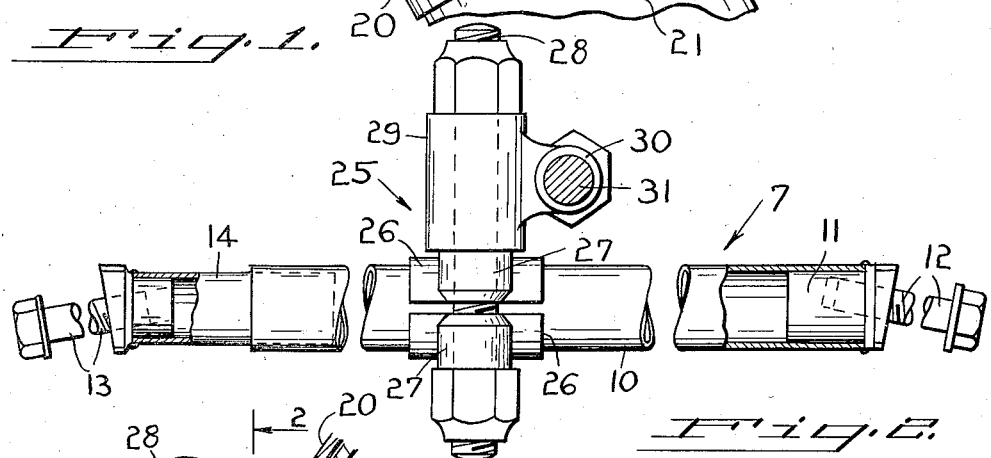
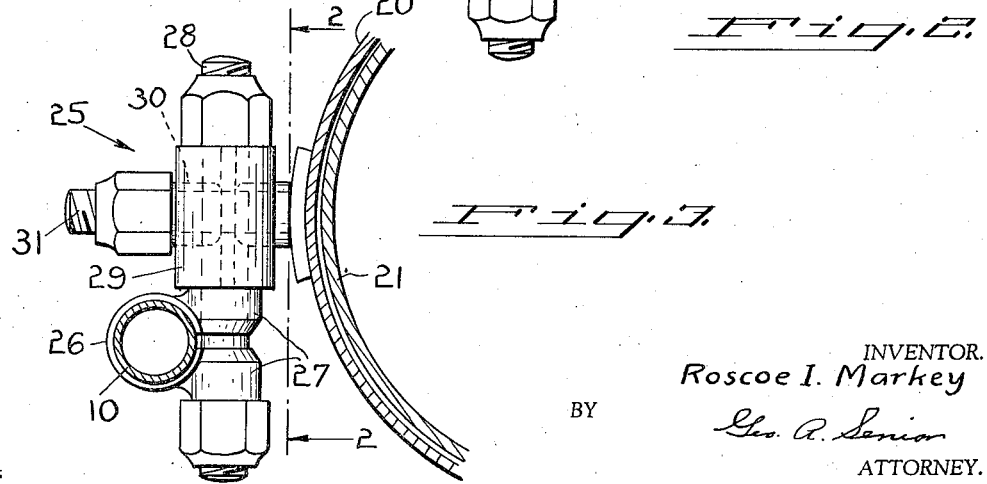
INVENTOR.
Roscoe I. Markey
BY
ATTORNEY.

Patented Oct. 29, 1940

2,219,655

UNITED STATES PATENT OFFICE 2,219,655

MEANS FOR SUPPORTING TAIL PIPES

Roscoe I. Markey, East Orange, N. J., assignor to Pollak Manufacturing Company, Arlington, N. J., a corporation of New Jersey Application September 30, 1939, Serial No. 297,243

5 Claims. (Cl. 248—74)

The invention relates to a means for supporting tail pipes or the outlet pipes of exhaust manifold systems, particularly used on radial type engines for aircraft.

The exhaust manifold system for a radial type aircraft engine comprises a hollow annular collector ring having a plurality of branch pipes leading to the exhaust outlets of the engine cylinder and a tail pipe or outlet pipe leading from the collector ring to atmosphere. This tail pipe is of substantial diameter and much difficulty has been encountered in properly supporting it. This is due to the expansion and contraction of the manifold parts and the engine caused by the excessive heat developed by the engine when in operation. Where the tail pipe is rigidly supported it will invariably crack or break due to the aforesaid mentioned expansion and contraction.

The principal object of the present invention is to provide an exceedingly simple means which readily lends itself to great ease of installation for efficiently and firmly supporting the tail pipe on the engine and at the same time allowing it a sufficient range of motion in relation to the engine to eliminate the harmful results heretofore enumerated.

Other objects and advantages will appear as this specification proceeds. Referring to the drawing forming a part thereof, and in which a preferred form of the invention is illustrated:

Fig. 1 is a front elevation; parts being broken away and parts of the engine being indicated in broken lines.

Fig. 2 is a rear view with parts broken away and parts in section; and

Fig. 3 is an end view, parts being in section.

Referring again to said drawing the engine rocker boxes are indicated in broken lines at 5—5. Projecting apertured lugs 6 may be formed on the rocker boxes or suitably attached thereto.

A telescopic connection 7 for supporting the tail pipe in a manner hereinafter described, extends between a pair of lugs 6—6. Each cylinder has a pair of rocker boxes and in some instances it will be convenient to have the telescopic connection extend between rocker boxes on different adjacent cylinders and in others to extend between rocker boxes on the same cylinder. This will depend upon the most convenient location for the tail pipe.

The telescopic connections 7 comprises a tubular member 10 extending a substantial part of the distance between the pair of lugs 6—6. One end of the tubular member 10 is closed by a plug 11 having a slabbed off face to abut the lug and secured to the lug by a bolt 12 which passes through the aperture in the lug and threads into the plug 11. Secured in a similar fashion to the other lug 6 by a bolt 13 is a shorter member 14 which telescopes into and has sliding engagement with the member 10.

A clamp 20 which carries the tail pipe 21 is suitably secured to the member 10. This clamp may be in the nature of the one disclosed in my copending application, Serial No. 296,799, filed September 27, 1939, or any other which will preferably permit slight axial and angular movement of the tail pipe sections. However a rigid clamp would not be precluded and in some instances might be desirable. A small portion of the manifold collector ring is indicated at 22.

The clamp is secured to the telescopic member by what might be termed a universal connection 25. This connection comprises a split collar 26 having a pair of apertured ears 27. The collar takes over the member 10 and is secured thereto by a stud 28 which passes through the apertured ears 27 and a sleeve 29. The sleeve 29 has secured thereto or formed as a part thereof another collar 30. The collar 30 extends at right angles to the sleeve and a stud 31 passes through it and is secured therein. The stud 31 carries the clamp 20. It will thus be apparent the connection 25 may be adjusted in all directions so as to compensate for different arrangements of tail pipes.

Such changes in details of construction and arrangements of parts as would occur to one skilled in the art are to be considered as coming within the spirit of the invention as defined in the appended claims.

I claim:

1. A supporting means for a tail pipe of a manifold collector ring, said supporting means comprising a telescopic connection between two parts of the engine, a clamp carrying the tail pipe, and means for securing said clamp to said telescopic connection.

2. A supporting means for a tail pipe of a manifold collector ring, said supporting means comprising a telescopic connection between lugs on the rocker boxes of the engine cylinders, a clamp carrying the tail pipe, and means for securing said clamp to said telescopic connection.

3. A supporting means for a tail pipe of a manifold collector ring, said supporting means comprising a telescopic connection between lugs on the rocker boxes of the engine cylinders, a clamp carrying the tail pipe, and a universal connection between said clamp and said telescopic connection.

4. A supporting means for a tail pipe of a manifold collector ring, said supporting means comprising a tubular member secured to a lug on one of the rocker boxes of the engine, another member secured to a lug on another rocker box of the engine, said member telescoping into said tubular member, a clamp carrying the tail pipe, and a universal connection between said clamp and said tubular member.

5. A supporting means for a tail pipe of a manifold collector ring, said supporting means comprising a tubular member secured to a lug on one of the rocker boxes of the engine, another member secured to a lug on another rocker box of the engine, said member telescoping into said tubular member, a clamp carrying the tail pipe, and a universal connection between said clamp and said tubular member, said universal connection comprising a split collar having a pair of apertured ears, a sleeve, a stud passing through and securing together said sleeve and said ears, a collar secured to said sleeve at right angles thereto, and a stud mounted in said sleeve, said stud carrying said clamp.

ROSCOE I. MARKEY.